United States Patent

(12) United States Patent
Ito

(10) Patent No.: US 8,081,237 B2
(45) Date of Patent: Dec. 20, 2011

(54) DATA RECORDING APPARATUS AND METHOD FOR PROTECTING HARD DISK DRIVE AND COMPUTER PROGRAM

(75) Inventor: Ryogo Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 568 days.

(21) Appl. No.: 12/209,365

(22) Filed: Sep. 12, 2008

(65) Prior Publication Data
US 2009/0109303 A1 Apr. 30, 2009

(30) Foreign Application Priority Data

Oct. 31, 2007 (JP) ................................. 2007-284461

(51) Int. Cl.
H04N 5/76 (2006.01)
G11B 7/00 (2006.01)
G11B 11/00 (2006.01)
(52) U.S. Cl. ................. 348/231.9; 369/44.32; 369/53.18
(58) Field of Classification Search ................ 348/231.9
See application file for complete search history.

(56) References Cited

U.S. PATENT DOCUMENTS

| 6,833,864 B1* | 12/2004 | Ashida ........................ 348/229.1 |
| 7,042,663 B2* | 5/2006 | Shimotono et al. ............. 360/31 |
| 7,191,089 B2* | 3/2007 | Clifford et al. ............... 702/141 |
| 7,356,437 B2 | 4/2008 | Kobayashi et al. |
| 7,450,332 B2* | 11/2008 | Pasolini et al. ................. 360/75 |
| 7,551,389 B2* | 6/2009 | Tsuda et al. .................... 360/75 |
| 2006/0044668 A1 | 3/2006 | Cho |
| 2007/0067139 A1 | 3/2007 | Kobayashi et al. |

FOREIGN PATENT DOCUMENTS

| EP | 1 983 518 A1 | 10/2008 |
| JP | 63-149887 | 6/1988 |
| JP | 2002-259066 | 9/2002 |
| JP | 2005-190641 | 7/2005 |
| JP | 2007-87469 | 4/2007 |
| JP | 2007-208864 | 8/2007 |

* cited by examiner

Primary Examiner — Lin Ye
Assistant Examiner — John H Morehead, III
(74) Attorney, Agent, or Firm — Oblon, Spivak, McClelland, Maier & Neustadt, L.L.P.

(57) ABSTRACT

A data recording apparatus for recording data on a recording medium includes an acceleration detector configured to detect an acceleration which the apparatus is undergoing; a use mode detector configured to detect which one of fixed and non-fixed modes the apparatus is used in; a fall state determination unit configured to determine a fall state of the apparatus by switching fall detection algorithms for detecting a fall of the apparatus on the basis of an acceleration detected by the acceleration detector and the history of acceleration changes in accordance with the detection result by the use mode detector; and a preventive operation controller configured to cause an operation for preventing damage to the recording medium to be performed in accordance with the determination result of the fall state of the apparatus by the fall state determination unit.

8 Claims, 10 Drawing Sheets

DATA RECORDING APPARATUS AND METHOD FOR PROTECTING HARD DISK DRIVE AND COMPUTER PROGRAM

CROSS REFERENCES TO RELATED APPLICATIONS

The present invention contains subject matter related to Japanese Patent Application JP 2007-284461 filed in the Japanese Patent Office on Oct. 31, 2007, the entire contents of which are incorporated herein by reference.

BACKGROUND OF THE INVENTION

1. Field of the Invention

The present invention relates to a data recording apparatus for recording data on recording media, such as a digital video camera or a digital still camera for recording image-captured data, to a method for controlling the data recording apparatus, and to a computer program and, in particular, relates to a data recording apparatus for performing an operation of recording data on recording media in a plurality of use modes in such a manner that a user performs image capturing while holding the data recording apparatus in his/her hand or with the main unit thereof being fixed to a tripod, to a method for controlling the data recording apparatus, and to a computer program.

More particularly, the present invention relates to a data recording apparatus for recording data on recording media in such a manner that a read/write head carries out a seeking operation on a recording surface as in the case of, for example, a hard disk, thereby enabling random access, to a method for controlling the data recording apparatus, and to a computer program and, in particular, relates to a data recording apparatus in which the risk of damage to the apparatus is reduced by retracting the head from the recording surface of a disk when the apparatus is dropped on the basis of the detection result of an acceleration sensor or the like, to a method for controlling the data recording apparatus, and to a computer program.

2. Description of the Related Art

With the development of information technology, such as information processing and information communication, there has arisen a necessity to reuse information that was created and edited in the past. For this reason, information storage technology has become increasingly important.

Until now, information recording apparatuses using various media, such as magnetic tapes and magnetic disks, have been developed and become popular. In disk-type recording media, such as hard disks, basically, random access is possible by performing an operation in which a read/write head carries out a seeking operation in a radial direction on the recording surface of a rotating disk.

Hard disks have already become widely popular. For example, as standard local recording apparatuses for personal computers, in order to install various types of software, such as an operating system (OS) and application programs, which are necessary to start up a computer, and in order to store various kinds of data files that are created or edited, hard disks are used.

Furthermore, also, for information devices that handle data of a large size such as digital video cameras, hard disks have come to be used as local recording apparatuses or externally provided recording apparatuses (see, for example, Japanese Unexamined Patent Application Publication Nos. 2007-208864 and 2007-87469). When a hard disk is used for a recording device of a digital video camera, digital recording of many items of high-quality image data and random access to recorded data are possible. Furthermore, connection can be made to a computer, so that files can be manipulated or images can be edited in the computer. Furthermore, recently, hard disk drives are used for operation devices that are designed under the assumption that they are to be carried by a user on the move as in portable music playback devices and devices installed in mobile bodies such as navigation devices. By using a hard disk for these information devices, it is possible to decrease the weight, the volume, and the cost of the device when compared to the case in which a removable magnetic tape or optical disc is used. In addition, since the device is not limited by the size of the recording medium and the layout of the removable unit, miniaturization of the device is realized and the degree of freedom of design is increased.

For hard disk drives, a technology is used in which an air layer is created between a magnetic disk and a magnetic head as a result of the rotation of the magnetic disk on which a magnetic substance has been applied or deposited, causing the magnetic head to slightly float. That is, when the magnetic disk is stopped, the magnetic head is lightly in contact with the magnetic disk surface. The flow of air that occurs with the rotation of the magnetic disk causes the magnetic head to float, and recording and reproduction are performed. While non-contact between the magnetic disk and the magnetic head is maintained, magnetic recording at a high density is realized by decreasing the distance between the disk and the head.

With such a mechanism, hard disk drives are considered to be recording apparatuses that are vulnerable to impact. In particular, in a case where a hard disk drive is installed in a device that is operated while being held as in a digital camera or a portable device, when a user drops the device by mistake during operation, the risk of damage is high in that the head and the disk are brought into contact with each other due to impact when the device collides with the floor surface.

For this reason, some portable devices installed with a hard disk drive incorporate a scheme in which falling is detected by using an acceleration sensor, and the head is retracted before the device collides with the ground surface, thereby protecting the hard disk drive.

Furthermore, in information devices installed with a hard disk drive, an intermittent recording method is often applied from the viewpoint of lower power consumption. For example, when image capturing is to be performed using a digital camera, the hard disk drive is placed in an idle state, image-captured data is temporarily stored in the buffer memory, and the hard disk drive is set to an active state only during the period in which data stored in the buffer memory is output and recorded in the hard disk. Here, the hard disk drive is vulnerable to changes in the external environment in the active state. However, in the idle state, the rotation of the disk is stopped, and the head is fixed at the retraction position. Therefore, the probability of withstanding an impact is high. Accordingly, an information processing apparatus and an image-capturing apparatus have been proposed in which when it is determined on the basis of the detection result by the acceleration sensor or the like that the apparatus is in a state in which it is difficult to perform safe data recording, the apparatus does not enter an active state, and the idle state of the hard disk drive is maintained (see, for example, Japanese Unexamined Patent Application Publication No. 2007-208864).

As a processing method for accurately determining whether an apparatus is falling, a method for predicting a state in which the apparatus begins to freely fall by using both an acceleration (gravity state) at the current time, which is detected from an acceleration sensor, and a history of acceleration changes has been proposed (see, for example, Japanese Unexamined Patent Application Publication No. 2007-87469). By retracting the head at a predicted timing at which the apparatus begins to freely fall, it is possible to avoid damage to the hard disk.

According to the above-described prediction method, it is possible to suitably predict a state in which the user loses hold of a portable device and the portable device begins to fall. However, modes in which image capturing is performed using a digital camera include a case in which the main body thereof is fixed to a tripod or the like and image capturing is performed in addition to a case in which a user holds a digital camera by hand and image capturing is performed. Between when the digital camera begins to freely fall and when the tripod on which the digital camera is mounted falls over, the acceleration (gravity state) detected by the digital camera and the history of the acceleration changes differ. For this reason, a fall detection algorithm for detecting whether the digital camera is falling has a problem in that it is incapable of performing accurate prediction when a tripod is fixed.

SUMMARY OF THE INVENTION

It is desirable to provide a superior data recording apparatus capable of suitably performing a data recording operation on a recording medium in a plurality of use modes in which, for example, a user holds the data recording apparatus by hand and image capturing is performed or the main body of the recording apparatus is fixed to a tripod and image capturing is performed, a superior method of controlling the data recording apparatus, and a superior computer program.

It is further desirable to provide a superior data recording apparatus capable of suitably recording image-captured data or the like on recording media in such a manner that, for example, as a result of a read/write head performed a seeking operation on the recording surface of a disk as in a hard disk, random access becomes possible, a superior method of controlling the data recording apparatus, and a superior computer program.

It is further desirable to provide a superior data recording apparatus capable of reducing a risk of being damaged by retracting the head from the recording surface of a disk when the apparatus is dropped on the basis of the detection result of an acceleration sensor or the like, a superior method of controlling the data recording apparatus, and a superior computer program.

It is further desirable to provide a superior data recording apparatus which is capable of accurately predicting, in accordance with the use mode of the apparatus, a state in which the apparatus begins to fall on the basis of the detection result of an acceleration sensor, and which is capable of retracting the head from the recording surface of a disk, thereby reducing the risk of being damaged, a superior method of controlling the data recording apparatus, and a superior computer program.

The present invention has been made in view of the above-described problems. According to a first embodiment of the present invention, there is provided a data recording apparatus for recording data on a recording medium, the data recording apparatus including: acceleration detection means for detecting an acceleration which the apparatus is undergoing; use mode detection means for detecting which one of fixed and non-fixed modes the apparatus is used in; fall state determination means for determining a fall state of the apparatus by switching fall detection algorithms for detecting a fall of the apparatus on the basis of an acceleration detected by the acceleration detection means and the history of acceleration changes in accordance with the detection result by the use mode detection means; and preventive operation control means for causing an operation for preventing damage to the recording medium to be performed in accordance with the determination result of the fall state of the apparatus by the fall state determination means.

Recording media capable of random access, such as hard disks, have become widely popular, and are used in computer systems such as personal computers, digital video cameras, portable music playback devices, and information devices such as navigation devices.

Hard disk drives are considered to be recording apparatuses vulnerable to impact. When a user drops the apparatus by mistake from hand during operation, the risk is high in that a head and a disk are brought into contact with each other due to impact when the apparatus collides with the floor surface and the hard disk drive is damaged. For this reason, some portable devices installed with a hard disk drive incorporate a scheme in which falling is detected by using an acceleration sensor, and the head is retracted before the device collides with the ground surface, thereby protecting the hard disk drive.

Here, as a processing method for accurately determining falling of a device, a method for predicting a state in which the device begins to freely fall by using both an acceleration (gravity state) at the current time, which is detected from an acceleration sensor and the history of acceleration changes, has been proposed. However, in the case of a digital camera, as an example of mode of operation, in addition to that a user performs image capturing with the digital camera being held by hand, a case in which the main body of the digital camera is fixed to a tripod or the like and image capturing is performed is shown. Between when the digital camera begins to freely fall and when the tripod on which the digital camera is mounted falls over, the acceleration (gravity state) detected by the digital camera and the history of acceleration changes differ. For this reason, in a fall detection algorithm during a free fall, it is difficult to perform accurate prediction when the tripod is fixed.

Accordingly, the data recording apparatus according to an embodiment of the present invention allows fall detection control to be activated at a fixed period. The data recording apparatus includes a detector for detecting the use mode of the apparatus, so that the detection result of the detector is confirmed periodically at each period and fall detection algorithms are switched in accordance with the use mode.

The fall detection algorithm used in an embodiment of the present invention is such that, basically, the acceleration (gravity state) at the current time and the history of acceleration changes are detected from the output of the acceleration sensor incorporated in the apparatus and a state in which the apparatus begins to fall is predicted on the basis of the above. In the data recording apparatus installed with a hard disk drive, the damage to the disk is prevented by retracting the head in response to a free-fall prediction result. In a case where the data recording apparatus is a digital camera, it includes a tripod detector for detecting whether or not the digital camera is mounted on the tripod, so that fall detection control in response to each of when the camera is fixed and when the camera is not fixed is activated in accordance with the detection result, and the fall detection accuracy can be improved in both the use modes.

According to a second embodiment of the present invention, there is provided a computer program written in a computer-readable format so as to perform a process for controlling a data recording apparatus for recording data on a recording medium in a computer, the computer program causing the computer to function as: acceleration detection means for detecting an acceleration which the apparatus is undergoing and a history of acceleration changes on the basis of an output of the acceleration sensor disposed in the data recording apparatus; use mode detection means for detecting which one of fixed and non-fixed modes the apparatus is used in; fall state determination means for determining a fall state of the apparatus by switching fall detection algorithms for detecting a fall of the apparatus on the basis of the acceleration detected by the acceleration detection means and the history of the acceleration changes in accordance with the detection result by the use mode detection means; and preventive operation control means for causing an operation for preventing damage to the recording medium to be performed in accordance with the determination result of the fall state of the apparatus by the fall state determination means.

The computer program according to the second embodiment of the present invention is such that a computer program written in a computer-readable format is defined so that predetermined processing is implemented in a computer. In other words, by installing the computer program according to the second embodiment of the present invention in a computer, coordinated operation is exhibited in the computer, and the same operational effects as those of the data recording apparatus according to the first embodiment of the present invention can be obtained.

According to the embodiments of the present invention, there are provided a superior data recording apparatus capable of suitably performing a data recording operation on a recording medium in a plurality of use modes in which, for example, a user holds the data recording apparatus by hand and image capturing is performed or the main body of the recording apparatus is fixed to a tripod and image capturing is performed, a superior method of controlling the data recording apparatus, and a superior computer program.

According to the embodiments of the present invention, there are provided a superior data recording apparatus capable of suitably recording image-captured data or the like on recording media in such a manner that, for example, as a result of a read/write head performing a seeking operation on the recording surface of a disk as in a hard disk, random access becomes possible, a superior method of controlling the data recording apparatus, and a superior computer program.

According to the embodiments of the present invention, there are provided a superior data recording apparatus capable of reducing a risk of being damaged by retracting the head from the recording surface of a disk when the apparatus is dropped on the basis of the detection result of an acceleration sensor or the like, a superior method of controlling the data recording apparatus, and a superior computer program.

According to the embodiments of the present invention, there are provided a superior data recording apparatus which is capable of accurately predicting, in accordance with the use mode of the apparatus, a state in which the apparatus begins to fall on the basis of the detection result of an acceleration sensor, and which is capable of retracting the head from the recording surface of a disk, thereby reducing the risk of being damaged, a superior method of controlling the data recording apparatus, and a superior computer program.

In a case where an embodiment of the present invention is applied to a digital camera, fall detection control that is most appropriate when the camera is fixed can be activated. Therefore, the accuracy of fall detection can be improved when the camera is fixed in addition to when the camera is not fixed. Furthermore, it is possible to activate fall detection control in response to various camera operations that can be performed by the user, making it possible to improve fall detection accuracy.

Further objects, features and advantages of the present invention will become apparent from the following detailed description of the preferred embodiments with reference to the attached drawings.

DESCRIPTION OF THE PREFERRED EMBODIMENTS

Embodiments of the present invention will be described in detail below with reference to the drawings.

Figure 1:
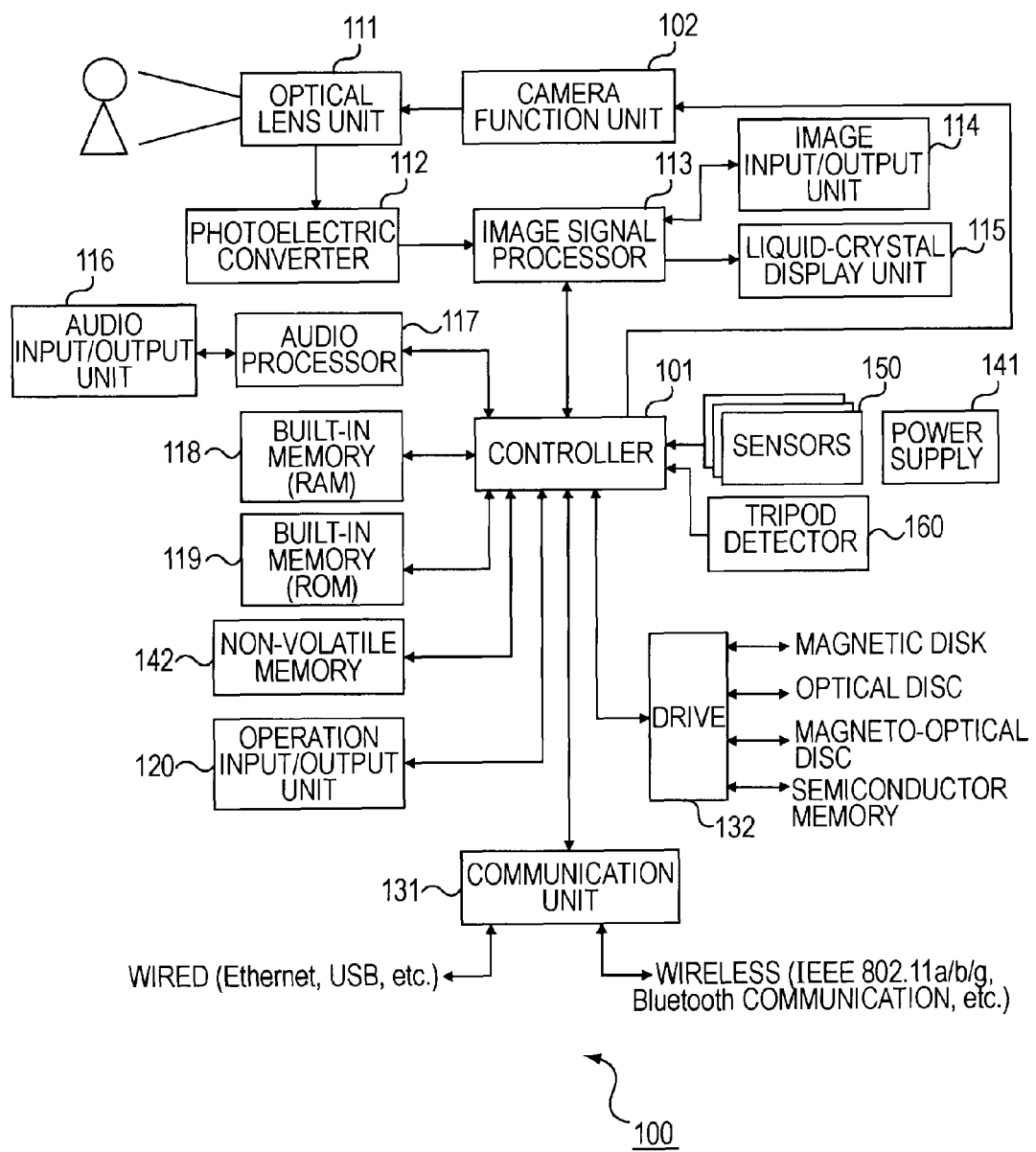
FIG. 1 schematically shows the configuration of a digital video camera 100.

FIG. 1 schematically shows the configuration of a digital video camera as an example of an apparatus that can be operated as a data recording apparatus according to an embodiment of the present invention.

The digital video camera 100 shown in the figure includes an optical lens unit 111, a photoelectric converter 112, a camera function controller 102, an image signal processor 113, an image input/output unit 114, a liquid-crystal display unit 115, an audio input/output unit 116, an audio signal processor 117, a communication unit 131, a controller 101, a built-in memory (RAM) 118, a built-in memory (ROM) 119, a non-volatile memory 142 such as an electrically erasable and programmable ROM (EEPROM) for storing predetermined data in a non-volatile manner, an operation input unit 120, a drive 132 for use for recording media, sensors 150, and a power supply 141 for supplying power to the above-described components.

The controller 101 is formed of a central processing unit (CPU) and the like, and performs processing in accordance with various kinds of processing programs stored in the read-only memory (ROM) 119. The random access memory (RAM) 118 is mainly used as an operation area, such as an intermittent result being temporarily recorded in each process. The controller 101 reads, from the ROM 119, a program for performing target processing in response to an operation input from the user, executes the program, and controls each unit, thereby controlling processing in accordance with instructions from the user.

The operation input unit 120 includes a mode switch key for switching operation modes, such as a moving-image capturing mode, a still-image capturing mode, and a VTR mode, a shutter key for capturing a still image, an image-capturing start key for capturing a moving image, and various operation keys and function keys, such as a record key, a play key, a stop key, a forward key, and a rewind key. The operation input unit 120 accepts operation input from the user and supplies, to the controller 101, an electrical signal in response to the accepted operation input.

In the moving-image capturing mode or in the still-image capturing mode, image-captured data input via the optical lens unit 111 is photoelectrically converted by the photoelectric converter 112 formed of a charge-coupled device (CCD), a complementary metal oxide semiconductor (CMOS), and the like.

In the image signal converter 113, preprocessing, such as correlated double sampling (CDS) and automatic gain control (AGC), is performed and thereafter, reproduction of an appropriate color state, resolution conversion, and color space conversion by auto white balance (AWB), coding compression processing, such as Joint Picture Experts Group (JPEG) or Moving Picture Experts Group (MPEG), are performed. The processed image data is recorded as a file on a recording medium.

Various kinds of recording media, such as a magnetic disk, an optical disc, a magneto-optical disc, and a semiconductor memory, can be loaded into the digital video camera 100. The digital video camera 100 records various kinds of information on these recording media and reproduces information recorded on these recording media via the drive 132.

The magnetic disk referred to herein includes a so-called hard disk. The recording area of the hard disk is managed by a file system, such as a file allocation table (FAT), so that it is possible for a host layer programs, such as applications and the operating system, to access a recording area inside the hard disk via the file system. Furthermore, the hard disk is controlled by a dedicated device driver, and the file system issues host commands, such as a write command and a read command, to the device driver.

The digital video camera 100 has an "image-capturing mode" in which image data obtained by capturing an image is recorded, via the drive 132, on various kinds of recording media, such as a magnetic disk, an optical disc, a magneto-optical disc, and a semiconductor memory; and a "VTR model" in which data received via the image input/output unit 114, the audio input/output unit 116, or the communication unit 131 is recorded on a recording medium and data recorded on the recording medium is reproduced.

The image-capturing mode includes a moving-image capturing mode in which a moving image is captured, and audio collected at the same time is recorded on the recording medium; and a still-image capturing mode in which still images are captured. Furthermore, in the VTR mode, data supplied by operating the operation input unit 120 formed of a record button switch and the like is recorded. Furthermore, by operating the play button switch, target data recorded on a recording medium can be reproduced.

Furthermore, the digital video camera 100 includes, as the sensors 150, an acceleration sensor for detecting an acceleration added to the device when the device begins to fall, a vibration sensor for detecting vibration of the device, a temperature sensor for detecting temperature inside the device or temperature of the environment in which the device is placed, a humidity sensor for detecting humidity inside the device or humidity of the environment in which the device is placed, an air pressure sensor for detecting an air pressure inside the device or an air pressure of the environment in which the device is placed, and an outgas sensor for detecting toxic gas for the hard disk, such as siloxane. Furthermore, the tripod detector 160 detects whether or not the digital video camera 100 is in a camera fixed state in which the digital video camera 100 is mounted on the tripod.

Here, the acceleration sensor is formed of a three-axis acceleration sensor corresponding to the three orthogonal axes of the X axis, the Y axis, and the Z axis, and inputs, to the controller 101, acceleration (Gx, Gy, Gz) information corresponding to the three orthogonal axes of the X axis, the Y axis, and the Z axis, which is added to the digital video camera 100 at intervals of, for example, 10 milliseconds.

The digital video camera 100 shown in FIG. 1 includes a hard disk drive as a main data recording apparatus. It is possible to record, on a hard disk, still image data, moving image data, and audio (or music) data, obtained by performing image capturing via the camera unit formed of the optical lens unit 111, the photoelectric converter 112, and the Like; still image data and moving image data, which are received from an external device via the image input/output unit 114; and still image data and moving image data, which are received via the communication unit 131.

Here, the hard disk drive is considered to be a recording apparatus vulnerable to impact. During operation, when the user drops the apparatus from hand by mistake, the risk is high in that the head and the disk are brought into contact with each other due to impact when the apparatus collides with the floor surface and the hard disk drive is damaged. For this reason, for some portable devices installed with a hard disk drive, a scheme in which falling is detected by using an acceleration sensor and the hard disk drive is protected by retracting the head before the device collides with the ground surface is indispensable.

In the present embodiment, a fall detection control method is applied to predict a state in which the apparatus begins to freely fall by using both an acceleration at the current time, which is detected from the acceleration sensor, and the history of acceleration changes (see Japanese Unexamined Patent Application Publication No. 2007-87469).

The acceleration sensor is formed of a three-axis acceleration sensor corresponding to the three orthogonal axes of the X axis, the Y axis, and the Z axis, and inputs, to the controller 101, acceleration (Gx, Gy, Gz) information corresponding to the three orthogonal axes of the X axis, the Y axis, and the Z axis, which is added to the digital video camera 100 at intervals of, for example, 10 milliseconds (described above).

The controller 101 periodically receives the acceleration (Gx, Gy, Gz) information detected by the acceleration sensor, records the acceleration information in the built-in memory 118, computes a combined value Gavg based on the acceleration (Gx, Gy, Gz) corresponding to the three orthogonal axes of the X axis, the Y axis, and the Z axis, and records the computed combined value Gavg together with the acceleration (Gx, Gy, Gz) corresponding to the three orthogonal axes in the built-in memory 118. The combined value is a value computed as a sum of squares of the acceleration values corresponding to the three orthogonal axes of the X axis, the Y axis, and the Z axis, as shown in, for example, the equation below:

$$G_{avg} = \sqrt{(Gx)^2 + (Gy)^2 + (Gz)^2} \quad (1)$$

The controller 101 records, in the built-in memory 118, the acceleration (Gx, Gy, Gz) in the direction of each orthogonal axis and the combined value Gavg, which is computed on the basis of the output values of the three-axis acceleration sensor at each measurement timing. As a result, in the built-in memory 118, the acceleration (Gx, Gy, Gz) in the direction of each orthogonal axis and acceleration history information in accordance with the time-related transition of the combined value Gavg are recorded.

Then, the controller 101 determines whether or not the digital video camera 101 is falling on the basis of the input value from the three-axis acceleration sensor and the acceleration history information recorded in the built-in memory 118. It is possible for the controller 101 to determine whether the digital video camera 101 is, for example, in a state in which the user is holding it or bringing it down, or in a falling state in such a manner as to distinguish the states from each other.

Figure 2:
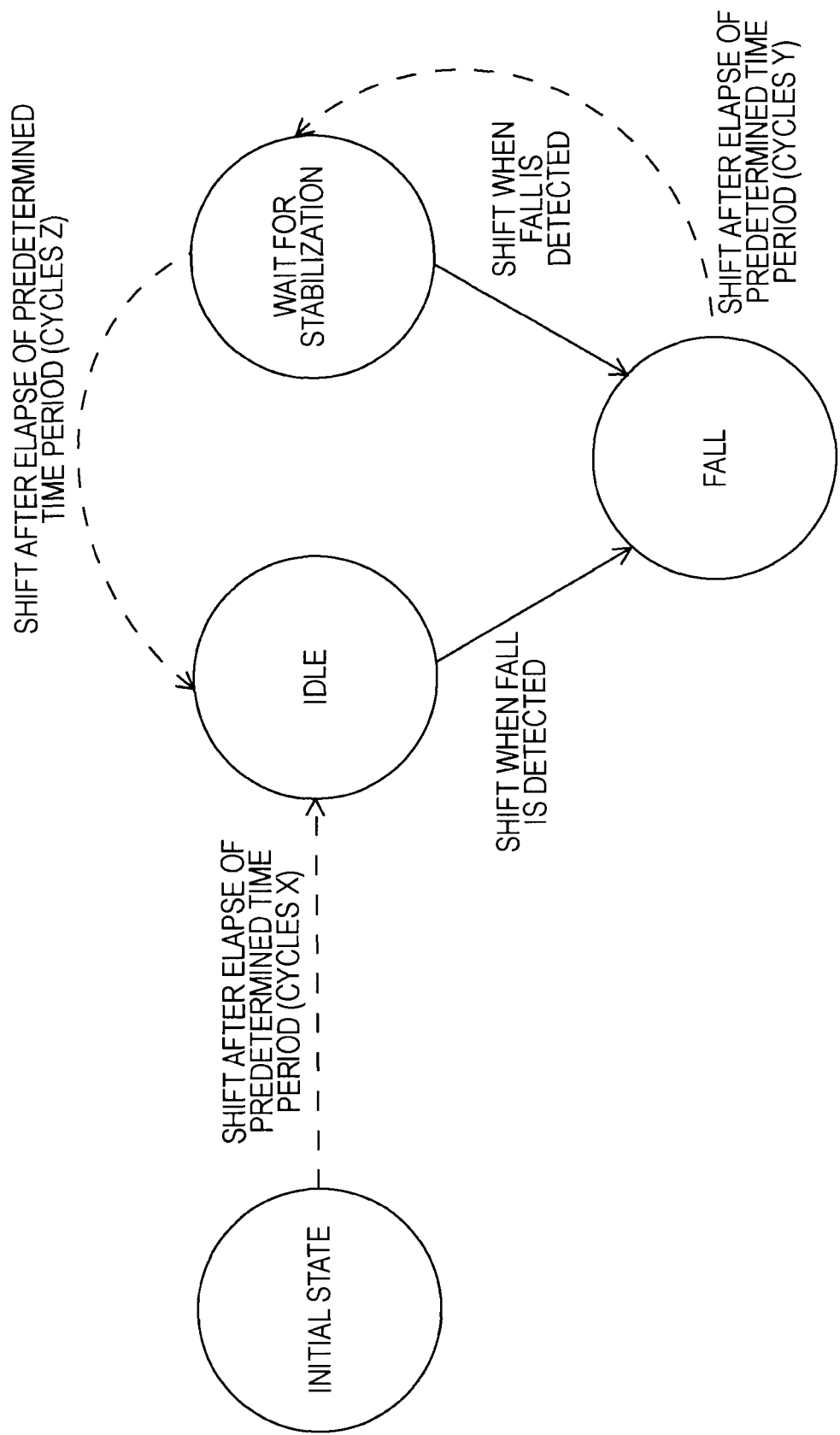
FIG. 2 shows a state transition diagram of the digital video camera 100 in response to a fall state.

FIG. 2 shows a state transition diagram of the digital video camera 100 in accordance with a fall state.

In the figure, "fall" and "wait for stabilization" each indicate a fall state, and "idle" and "initial state" each indicate a non-fall state. When a predetermined time period passes in the initial state, the apparatus enters an idle state. In the idle state, when falling is detected on the basis of acceleration which the digital video camera 100 is undergoing at the current time or on the basis of the history information on acceleration changes, the apparatus shifts to a fall state. In this fall state, when a predetermined time period passes, the apparatus shifts to a stabilization wait state. Even in the stabilization wait state, when falling is detected on the basis of the acceleration or the history information on acceleration changes, the apparatus returns to the fall state. Furthermore, in the stabilization wait state, when the predetermined time period passes without falling being detected, the apparatus returns to the idle state.

Furthermore, as a use mode (that is, a method in which the user performs image capturing) of the digital video camera 100, in addition to the method in which the user performs image capturing while holding the digital video camera 100 by hand, a method in which image capturing is performed with the main unit thereof being fixed to a tripod or the like is shown. Between when the digital camera begins to freely fall and when the tripod on which the digital camera is mounted falls over, the acceleration (gravity state) detected by the digital camera and the history of the acceleration changes differ.

Figure 3A:
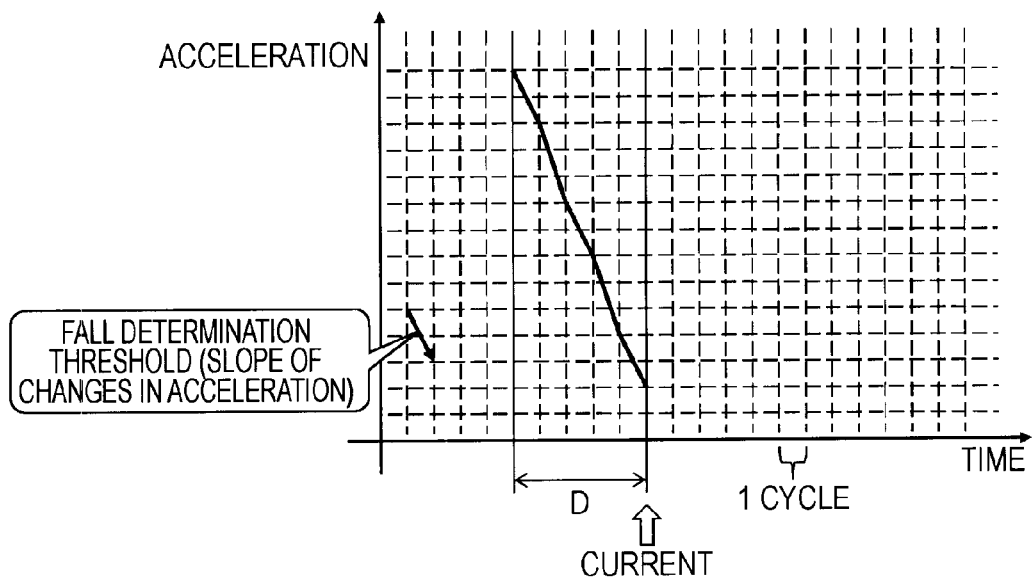
FIG. 3A shows a history of acceleration changes when the digital video camera 100 freely falls.
Figure 3B:
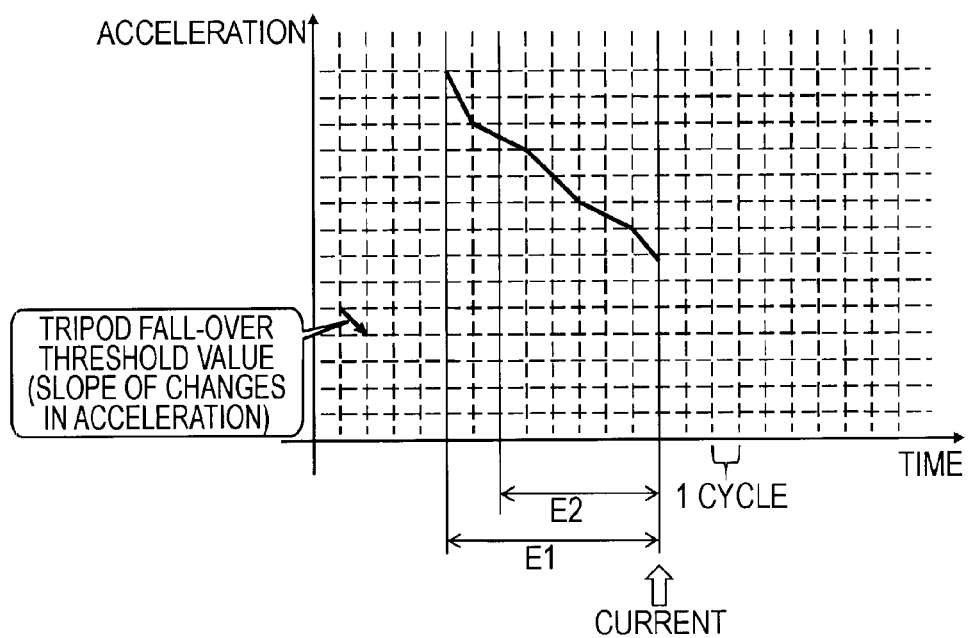
FIG. 3B shows a history of acceleration changes when the digital video camera 100 mounted on a tripod falls over.

FIGS. 3A and 3B show the histories of acceleration changes when the digital video camera 100 freely falls and when the tripod falls over, respectively. When both figures are compared, whereas the slope of the acceleration changes when the digital video camera 100 freely falls is sharp, the slope of the acceleration changes when the tripod falls over is comparatively moderate. That is, the difference in the acceleration changes between them is clear. Threshold values and algorithms differ between the free-fall filter for detecting acceleration changes shown in FIG. 3A and the tripod fall-over filter for detecting acceleration changes shown in FIG. 3B.

In the free-fall filter, it is not possible to determine acceleration changes due to falling over of the tripod, in which acceleration changes are moderate. Therefore, the time at which the falling over of the tripod is detected is delayed. As a result, there is a risk that the apparatus hits the ground without being able to retract the head of the hard disk drive. On the other hand, when the tripod fall-over filter is applied despite the fact that the digital video camera 100 is not mounted on the tripod, erroneous determination that the tripod has fallen over may be made even in the case of camera shake caused by a user manipulating the digital video camera 100 while holding it, and there is a risk that an unnecessary head retraction operation is initiated, causing a data recording process to be delayed. Therefore, when the digital video camera 100 is not mounted on the tripod, it is sufficient to apply a free-fall filter in the fall control detection control. However, when the digital video camera 100 is mounted on the tripod, furthermore, it is necessary to apply the tripod fall-over filter.

Accordingly, in the present embodiment, fall detection control is activated periodically for a fixed period. The detection result of the tripod detector 160 is confirmed at each period, and fall detection algorithms are switched in response to a use mode (that is, in response to which one of fixed image capturing in which the digital video camera 100 is mounted on the tripod and image capturing is performed and non-fixed image capturing in which the digital video camera 100 is not mounted on the tripod and image capturing is performed is used) of the digital video camera 100.

Figure 4:
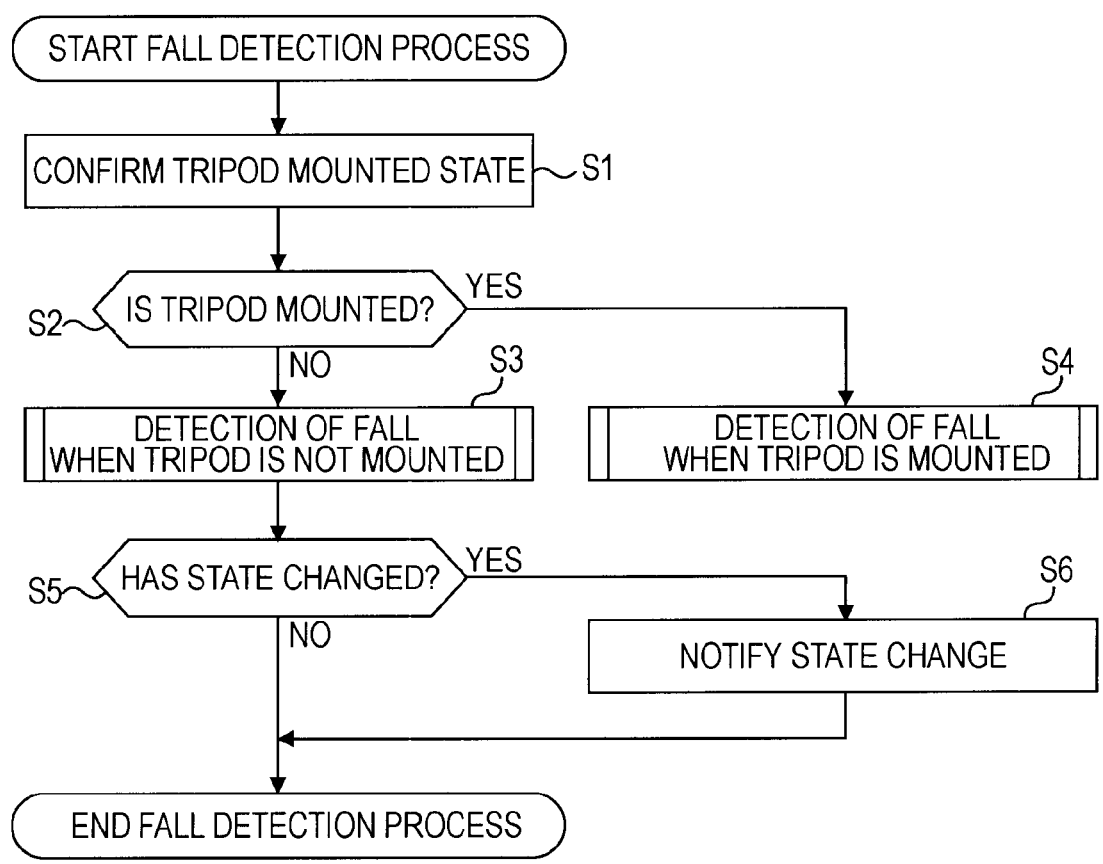
FIG. 4 is a flowchart showing a processing procedure for performing fall detection control of the digital video camera 100 while switching fall detection algorithms in accordance with whether or not the digital video camera 100 is mounted on a tripod.

FIG. 4 shows, in a flowchart, the processing procedure of performing fall detection control of the digital video camera 100 while switching fall detection algorithms according to whether the digital video camera 100 is mounted on the tripod.

First, the controller 101 checks whether or not the digital video camera 100 has been mounted on the tripod (step S1).

Here, when the digital video camera 100 has been mounted on the tripod (Yes in step S2), the controller 101 initiates a fall detection process in which a fall detection algorithm for when the digital video camera 100 is mounted on the tripod is applied (step S4). When the digital video camera 100 has not been mounted on the tripod (No in step S2), the controller 101 initiates a fall detection process in which a fall detection algorithm for when the digital video camera 100 is not mounted on the tripod is applied (step S3).

Then, when a state change is detected by the initiated fall detection process (step S5), the state change is notified (step S6).

When the digital video camera 100 has changed from the non-fall state to the fall state, the controller 101, for example, suspends the operation of recording data on the hard disk and retracts the head from the disk. Conversely, when the digital video camera 100 restores from the fall state to the non-fall state, the retracted head is returned to the disk, and the suspended data recording operation is restarted.

At this point, for the process for checking whether or not the digital video camera 100 has been mounted on the tripod in step S1, the mounting state may be indicated manually by the user via the operation input unit 120 and also, that process can be automatically performed on the basis of the detection result from the tripod detector 160.

Figure 5:
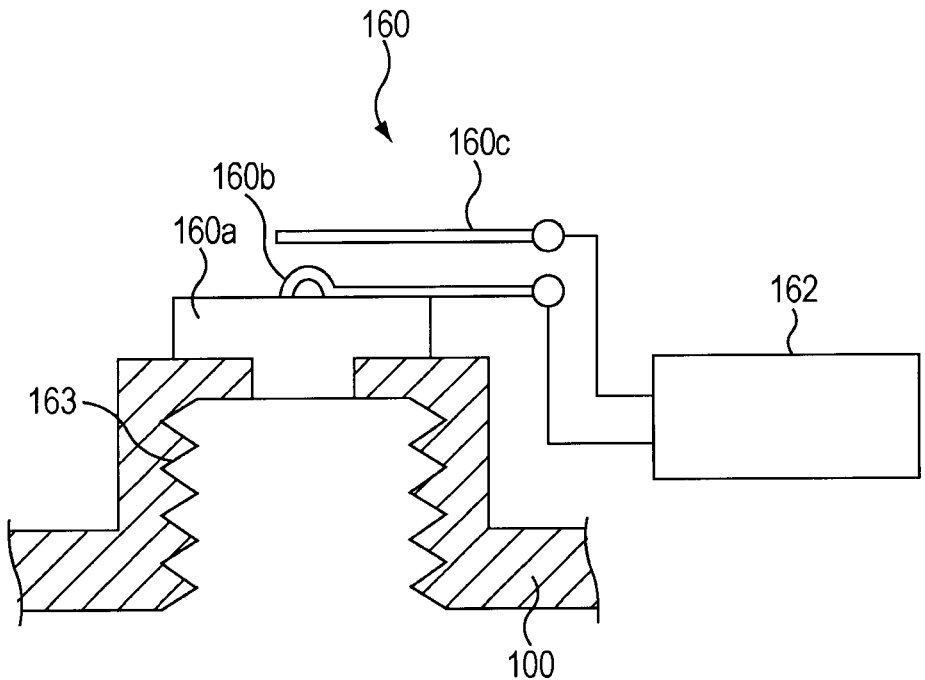
FIG. 5 is a sectional view illustrating a first specific example of a tripod detector 160.
Figure 6:
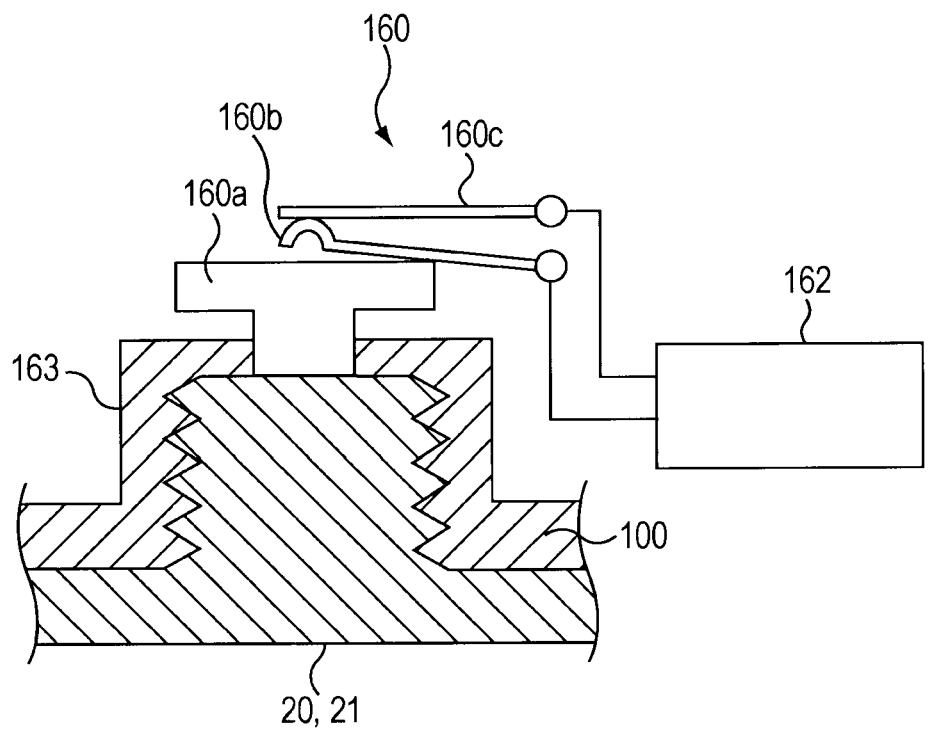
FIG. 6 is an illustration of the operation of the tripod detector 160 shown in FIG. 5.

FIG. 5 shows, in cross section, a first specific example of the tripod detector 160. FIG. 6 shows a state in which the tripod detector 160 shown in FIG. 5 operates. The tripod detector 160 shown in FIGS. 5 and 6 is formed of a tripod detection switch and a tripod detection circuit 162.

As shown in FIG. 5, a screw hole 163 provided in the bottom of the apparatus main body of the digital video camera 100 is provided with a movable part 160a in a projection form in the inner part of the screw hole 163, and a pair of contact pieces 160b and 160c having spring properties. One of the end portions of each of the contact pieces 160b and 160c is connected to the detection circuit 162. The contact pieces 160b and 160c are examples of the tripod detection switch. For example, in a state in which the tripod 20 is not mounted, the contact pieces 160b and 160c are placed in a non-conductive state, as shown in FIG. 5.

When the apparatus main body of the digital video camera 100 is to be mounted and fixed to the tripod 20, in the case that, as shown in FIG. 6, a mounting screw 21 (hereinafter will be referred to simply as a "tripod screw") of the tripod 20 is screwed to the screw hole 163 of the apparatus main body unit 100, the movable part 160a is pushed up by the tripod screw 21 against the urging force of the contact piece 160b, and the contact pieces 160b and 160c are short-circuited, causing the contact pieces 160b and 160c to be brought into a conductive state.

The detection circuit 162 outputs, to the controller 101, a detection signal indicating whether or not the tripod 20 has been mounted in response to the conductive state between the contact pieces 160b and 160c. On the other hand, when the tripod 20 is removed from the apparatus main body unit 100 (more specifically, when the tripod screw 21 is removed from the apparatus main body unit 100), as shown in FIG. 5, the contact piece 160b is separated from the other contact piece 160c due to its own elasticity and is brought into a non-conductive state.

Figure 7:
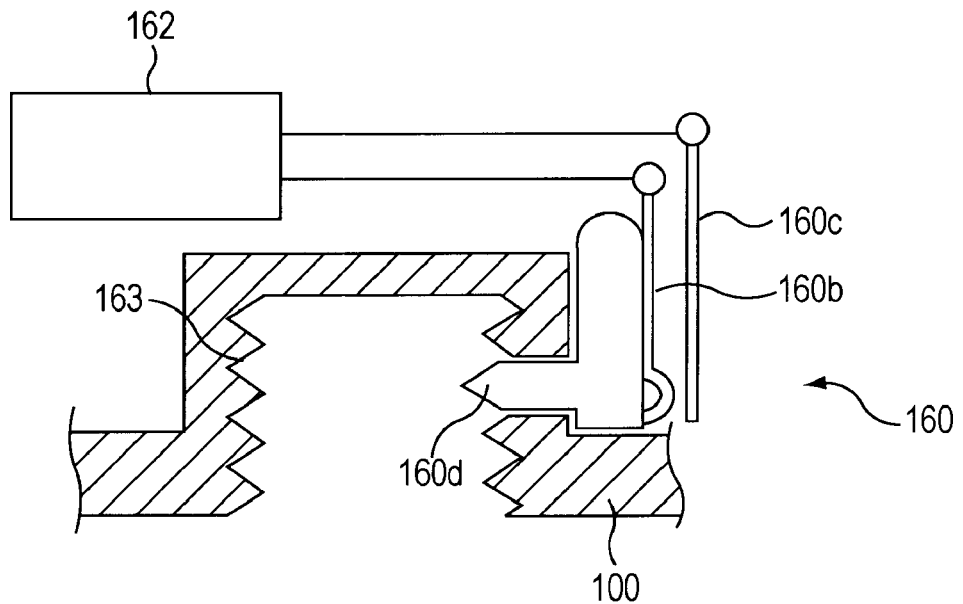
FIG. 7 is a sectional view illustrating a second specific example of the tripod detector 160.
Figure 8:
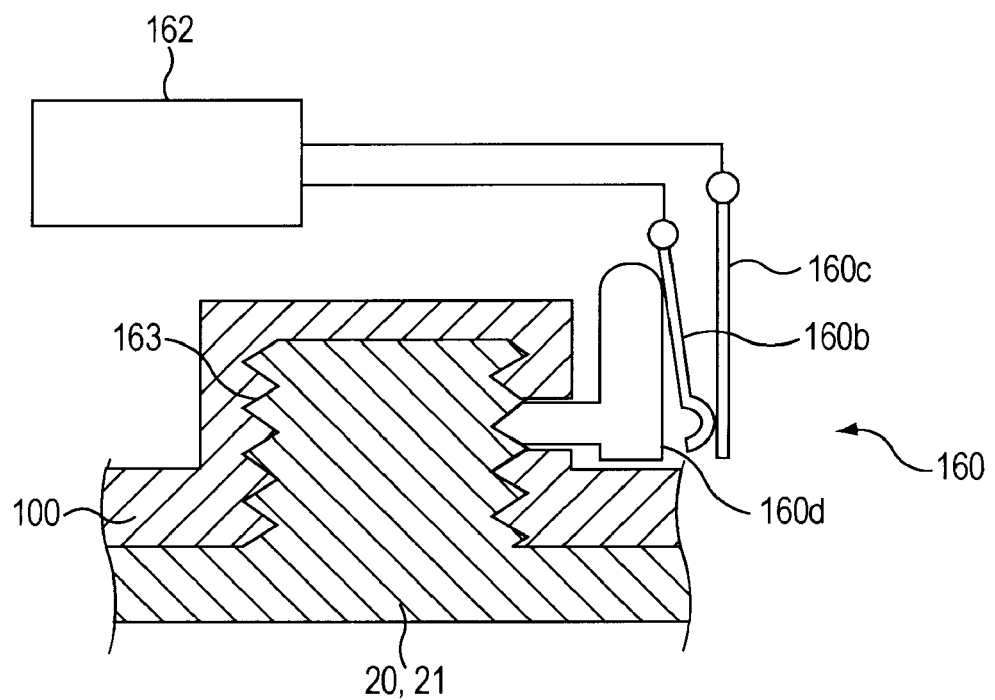
FIG. 8 illustrates the operation of the tripod detector 160 shown in FIG. 7.

FIG. 7 shows, in cross section, a second specific example of the tripod detector 160. FIG. 8 shows a state in which the tripod detector 160 shown in FIG. 7 operates. The tripod detection switch of the detector 160 shown in the figure may be provided with a substantially L-shaped movable part 160d on the side surface part of the screw hole 163, and a pair of contact pieces 160b and 160c having spring properties.

In a state in which the tripod 20 has not been mounted on the apparatus main body 100, the contact pieces 160b and 160c are placed in a non-conductive state, as shown in FIG. 7.

When the apparatus main body of the digital video camera 100 is to be mounted and fixed to the tripod 20, in the case that, as shown in FIG. 8, the tripod screw 21 of the tripod 20 is screwed to the screw hole 163 of the apparatus main body unit 100, the movable part 160a moves along the vertical direction to the side surface of the screw hole 163 in the tripod screw 21 against the urging force of the contact piece 160b, and the contact pieces 160b and 160c are short-circuited, thereby being brought into a conductive state.

Furthermore, when the tripod 20 is removed from the apparatus main body unit 100 (more specifically, when the tripod screw 21 is removed from the apparatus main body unit 100), as shown in FIG. 7, the contact piece 160b is separated from the other contact piece 160c due to its own elasticity and is brought into a non-conductive state.

since the detector 160 according to the second specific example is provided with the movable part 160d in the side surface part, it is possible to detect the mounting of the tripod 20 earlier than the detector according to the first specific example.

Figure 9:
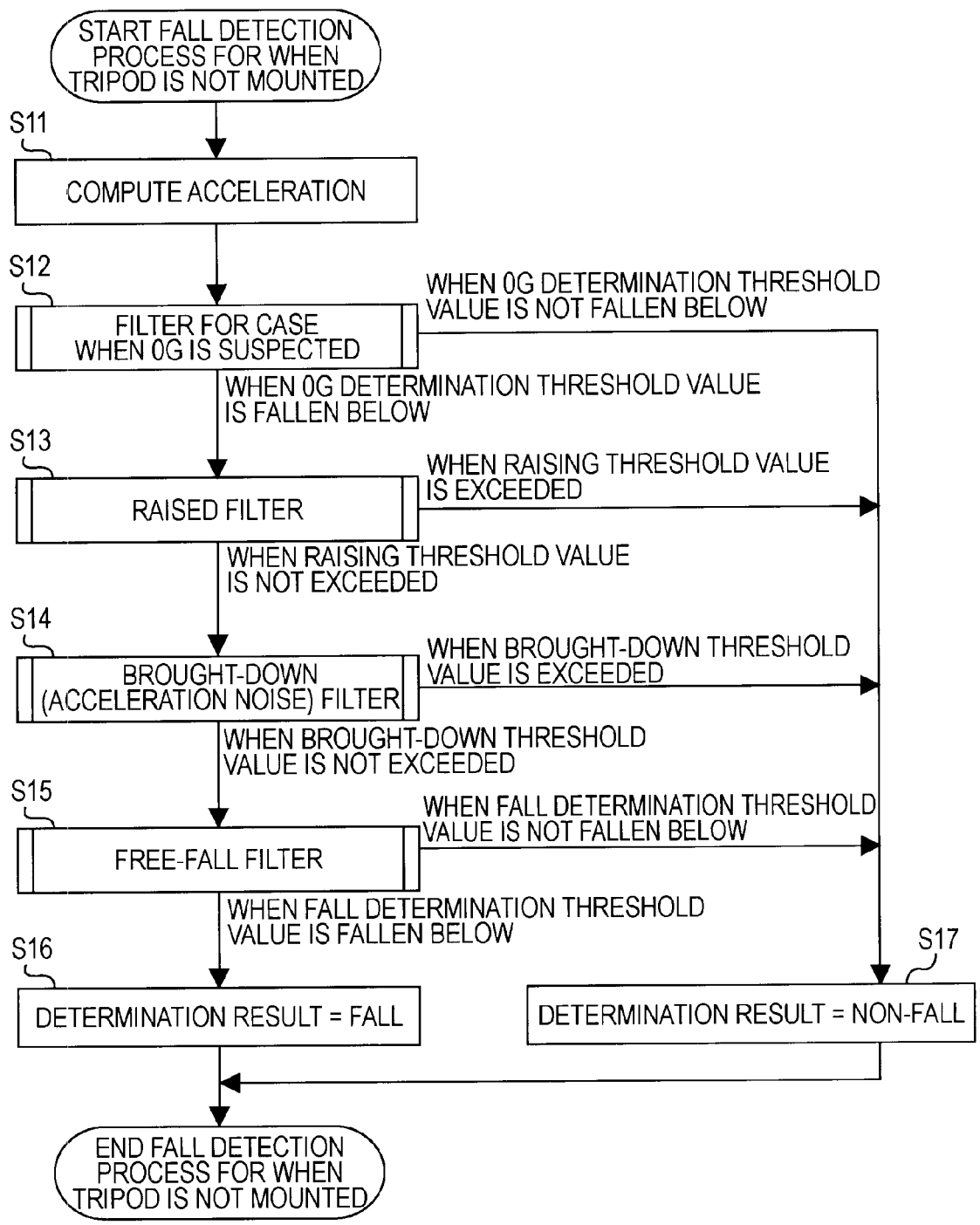
FIG. 9 is a flowchart showing the procedure of a fall detection process in which a fall detection algorithm for when a tripod is not mounted is applied.

FIG. 9 shows, in a flowchart, the procedure of a fall detection process in which a fall detection algorithm for when the digital video camera 100 is not mounted on the tripod, which is performed in step S3 of the flowchart shown in FIG. 4, is applied. The controller initiates processing (shown in the figure) at intervals of predetermined periods.

First, on the basis of acceleration (Gx, Gy, Gz) information input from the three-axis acceleration sensor, the controller 101 computes a combined value Gavg by using equation (1) described above (step S11). Then, the controller 101 records the computed combined value Gavg, together with acceleration (Gx, Gy, Gz) corresponding to the three orthogonal axes, in the built-in memory 118.

Next, by applying a "filter for case when OG is suspected" to history information on acceleration changes, which is recorded in the built-in memory 118, the controller 101 checks whether or not the acceleration Gavg has fallen below a OG determination threshold value even once for the past "A" cycles with respect to the current time (step S12). At this point, when the acceleration Gavg has not fallen below the OG determination threshold value even once for the past "A" cycles, the controller 101 responds with a determination result of a non-fall (step S17), and this processing routine is completed.

When the "filter for case when OG is suspected" is applied and the acceleration Gavg has fallen below the OG determination threshold value even once for the past "A" cycles, next, by applying a "raise filter", the controller 101 checks whether or not the acceleration Gavg for the past "B" cycles with respect to the current time has exceeded the raising threshold value even once (step S13). At this point, when the acceleration Gavg detected for the past "B" cycles has exceeded the raising threshold value even once, the controller 101 responds with a determination result of a non-fall (step S17), and this processing routine is completed.

When the "raise filter" is applied and the acceleration Gavg detected for the past "B" cycles has not exceeded the raising threshold value even once, next, the controller 101 applies a "bring-down filter" and checks whether or not the acceleration Gavg for the past "C" cycles with respect to the current time has exceeded a bring-down (acceleration noise) threshold value even once (step S14). At this point, when the acceleration Gavg detected for the past "C" cycles has exceeded the bring-down threshold value even once, the controller 101 responds with a determination result of a non-f-all (step S17), and this processing routine is completed.

When the "bring-down filter" is applied and the acceleration Gavg detected for the past "C" cycles has not exceeded the bring-down threshold value even once, next, the controller 101 applies a "free-fall filter" and checks whether or not the acceleration Gavg for the past "D" cycles with respect to the current time has exceeded a fall determination threshold value even once (step S15).

When the "free-fall filter" is applied and the acceleration Gavg detected for the past "D" cycles has not exceeded the fall determination threshold value even once, the controller 101 responds with a determination result of a non-fall (step S17), and this processing routine is completed.

In comparison, when the acceleration Gavg detected for the past "D" cycles has exceeded the fall determination threshold value even once, the controller 101 responds with a determination result of a fall (step S16), and this processing routine is completed.

Table 1 shows the filter types and the processing contents which are performed in steps S12-S15.

TABLE 1

| FILTER TYPE | Processing Content |
| --- | --- |
| FILTER FOR CASE WHEN 0G IS SUSPECTED | When the acceleration falls below the 0G determination threshold value even once for the past "A" cycles with respect to the current time, the next filter is applied. When the acceleration has not fallen below the 0G determination threshold value, the apparatus is determined to be not falling. |

TABLE 1-continued

| FILTER TYPE | Processing Content |
| --- | --- |
| RAISE FILTER | When the acceleration for the past "B" cycles with respect to the current time has exceeded the raising threshold value even once, the next filter is applied. When the acceleration has not exceeded the raising threshold value, the apparatus is determined to be not falling. |
| BROUGHT-DOWN (ACCELERATION NOISE) FILTER | When the acceleration for the past "C" cycles with respect to the current time has exceeded a bring-down threshold value even once, the next filter is applied. When the acceleration has not exceeded the bring-down threshold value, the apparatus is determined to be not falling. |
| FREE-FALL FILTER | When the acceleration for the past "D" cycles with respect to the current time has not exceeded a fall determination threshold value even once, the apparatus is determined to be not falling. When the acceleration has exceeded the fall determination threshold value, the apparatus determined to be falling. |

Figure 10:
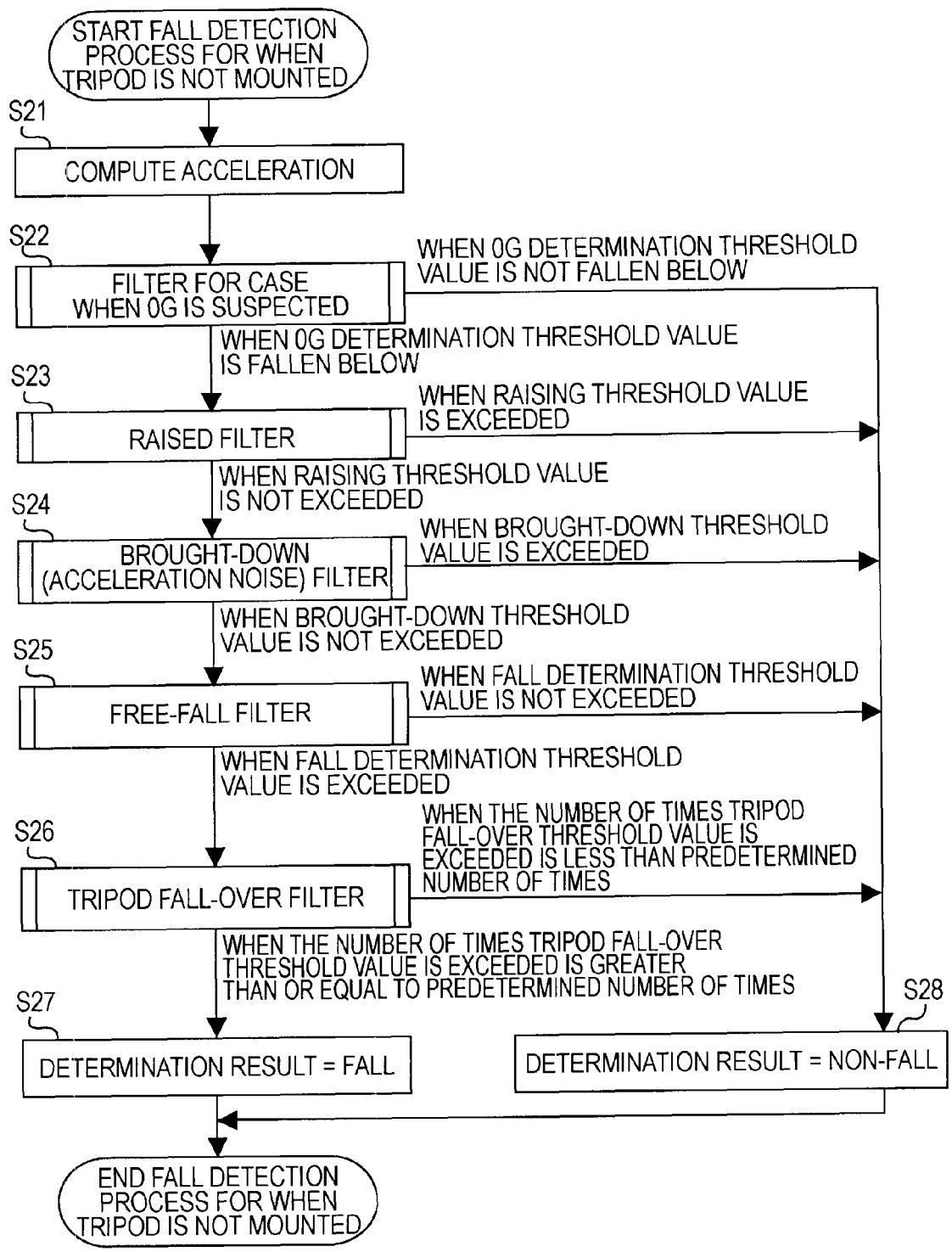
FIG. 10 is a flowchart showing the procedure of a fall detection process in which a fall detection algorithm for when a tripod is mounted is applied.

FIG. 10 shows, in a flowchart, the procedure of a fall detection process in which a fall detection algorithm for when the digital video camera 100 is mounted on the tripod, which is performed in step S4 of the flowchart shown in FIG. 4, is applied. The controller initiates processing shown in the figure at intervals of predetermined periods.

First, the controller 101 computes a combined value Gavg by using equation (1) above on the basis of the acceleration (Gx, Gy, Gz) information input from the three-axis acceleration sensor (step S21). Then, the controller 101 records the computed combined value Gavg, together with the acceleration (Gx, Gy, Gz) corresponding to the three orthogonal axes, in the built-in memory 118.

Next, the controller 101 applies a "filter for case when 0G is suspected" to the history information on the acceleration changes, which is recorded in the built-in memory 118, and checks whether or not the acceleration Gavg for the past "A" cycles with respect to the current time has fallen below a 0G determination threshold value even once (step S22). Here, when the acceleration Gavg detected for the past "A" cycles has not fallen below the 0G determination threshold value, the controller 101 responds with a determination result of a non-fall (step S28), and this processing routine is completed.

When the controller 101 applies the "filter for case when 0G is suspected" and the acceleration Gavg for the past "A" cycles with respect to the current time has fallen below the 0G determination threshold value even once, next, the controller 101 applies a "raise filter" and checks whether or not the acceleration Gavg for the past "B" cycles with respect to the current time has exceeded the raising threshold value even once (step S23). At this point, when the acceleration Gavg detected for the past "B" cycles has exceeded the raising threshold value even once, the controller 101 responds with a determination result of a non-fall (step S28), and this processing routine is completed.

When the "raise filter" is applied and the acceleration Gavg detected for the past "B" cycles has not exceeded the raising threshold value even once, next, the controller 101 applies a "bring-down filter" and checks whether or not the acceleration Gavg for the past "C" cycles with respect to the current time has exceeded a bring-down (acceleration noise) threshold value even once (step S24). At this point, when the acceleration Gavg detected for the past "C" cycles has exceeded a bring-down threshold value even once, the controller 101 responds with a determination result of a non-fall (step S28), and this processing routine is completed.

When the "bring-down filter" is applied and the acceleration Gavg detected for the past "C" cycles has not exceeded the bring-down threshold value even once, next, the controller 101 applies a "free-fall filter" and checks whether or not the acceleration Gavg for the past "C" cycles with respect to the current time has exceeded a fall determination threshold value even once (step S25). At this point, when the acceleration Gavg detected for the past "D" cycles has not exceeded a fall determination threshold value even once, the controller 101 responds with a determination result of a non-fall (step S28), and this processing routine is completed.

When the "free-fall filter" is applied and the acceleration Gavg detected for the past "D" cycles has exceeded the fall determination threshold value even once, next, the controller 101 applies a "tripod fall-over filter" and checks whether or not the acceleration Gavg detected for the past "E1" cycles has exceeded a tripod fall-over threshold value even once (step S26). At this point, when the number of times the acceleration Gavg detected for the past "E1" cycles has exceeded the tripod fall-over threshold value even once exceeds a predetermined number of times E2, the controller 101 responds with a determination result of a non-fall (step S28), and this processing routine is completed.

In comparison, when the number of times the acceleration Gavg detected for the past "E1" cycles has exceeded the tripod fall-over threshold value even once falls below the predetermined number of times E2, the controller 101 responds with a determination result of a non-fall (step S16), and this processing routine is completed.

Table 2 shows the filter types and the processing contents which are performed in steps S22- S26.

TABLE 2

| FILTER TYPE | Processing Content |
| --- | --- |
| FILTER FOR CASE WHEN 0G IS SUSPECTED | When the acceleration falls below the 0G determination threshold value even once for the past "A" cycles with respect to the current time, the next filter is applied. When the acceleration has not fallen below the 0G determination threshold value, the apparatus is determined to be not falling. |
| RAISE FILTER | When the acceleration for the past "B" cycles with respect to the current time has exceeded the raising threshold value even once, the next filter is applied. When the acceleration has not exceeded the raising threshold value, the apparatus is determined to be not falling. |
| BROUGHT-DOWN (ACCELERATION NOISE) FILTER | When the acceleration for the past "C" cycles with respect to the current time has exceeded a bring-down threshold value even once, the next filter is applied. When the acceleration has not exceeded the bring-down threshold value, the apparatus is determined to be not falling. |
| FREE-FALL FILTER | When the acceleration for the past "D" cycles with respect to the current time has not exceeded a fall determination threshold value even once, the apparatus is determined to be not falling. When the acceleration has exceeded the fall determination threshold value, the apparatus determined to be falling. |
| TRIPOD FALL-OVER FILTER | When the number of times the acceleration Gavg for the past "E1" cycles with respect to the current time has exceeded the tripod fall-over threshold value even once falls below the predetermined number of times E2, the apparatus is determined to be a non-fall state. When the number of times is E2 or more, the apparatus is determined to be falling. |

When the fall state of the digital video camera 100 is detected in accordance with the processing procedure shown in FIG. 9 or 10, for example, the controller 101 performs operations for suppressing influences of impact received at the time of hitting the ground, such as suspending the data recording operation on the hard disk and retracting the head from the disk. Conversely, when the apparatus is restored from the fall state to the non-fall state, the retracted head is returned to the disk, and the suspended data recording operation is restarted.

As described above, according to the present embodiment, it is possible to predict the state in which the apparatus begins to fall on the basis of the detection result of the acceleration sensor 150 incorporated in the apparatus according to the use mode of the apparatus, and it is possible to reduce the risk of being damaged by retracting the head from the recording surface of the disk. Since optimum fall detection control can be activated when the camera is fixed, it is possible to improve the accuracy of fall detection when the camera is fixed in addition to when the camera is not fixed. Furthermore, it is possible to activate fall detection control in response to various camera operations that can be performed by the user, making it possible to improve fall detection accuracy.

Figure 11:
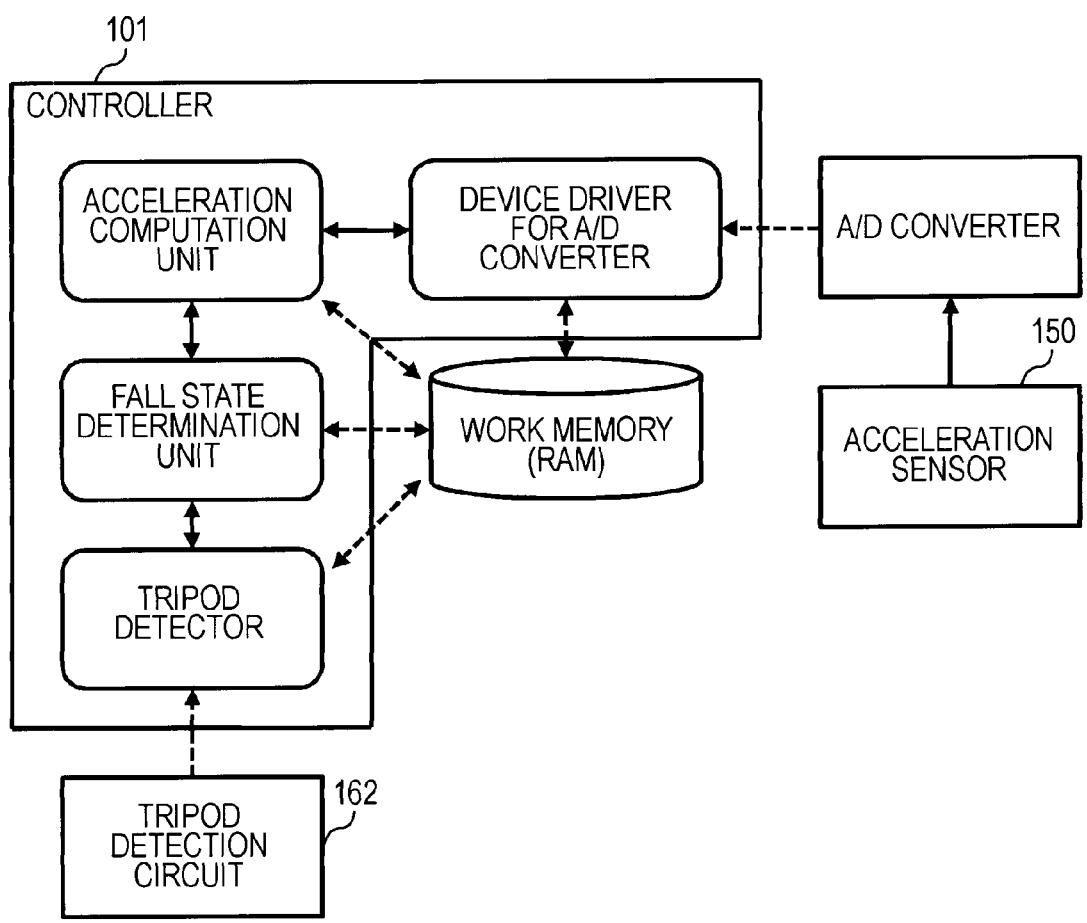
FIG. 11 schematically shows a functional configuration for implementing fall detection control when a detection signal of an acceleration sensor 150 is input in an analog manner.
Figure 12:
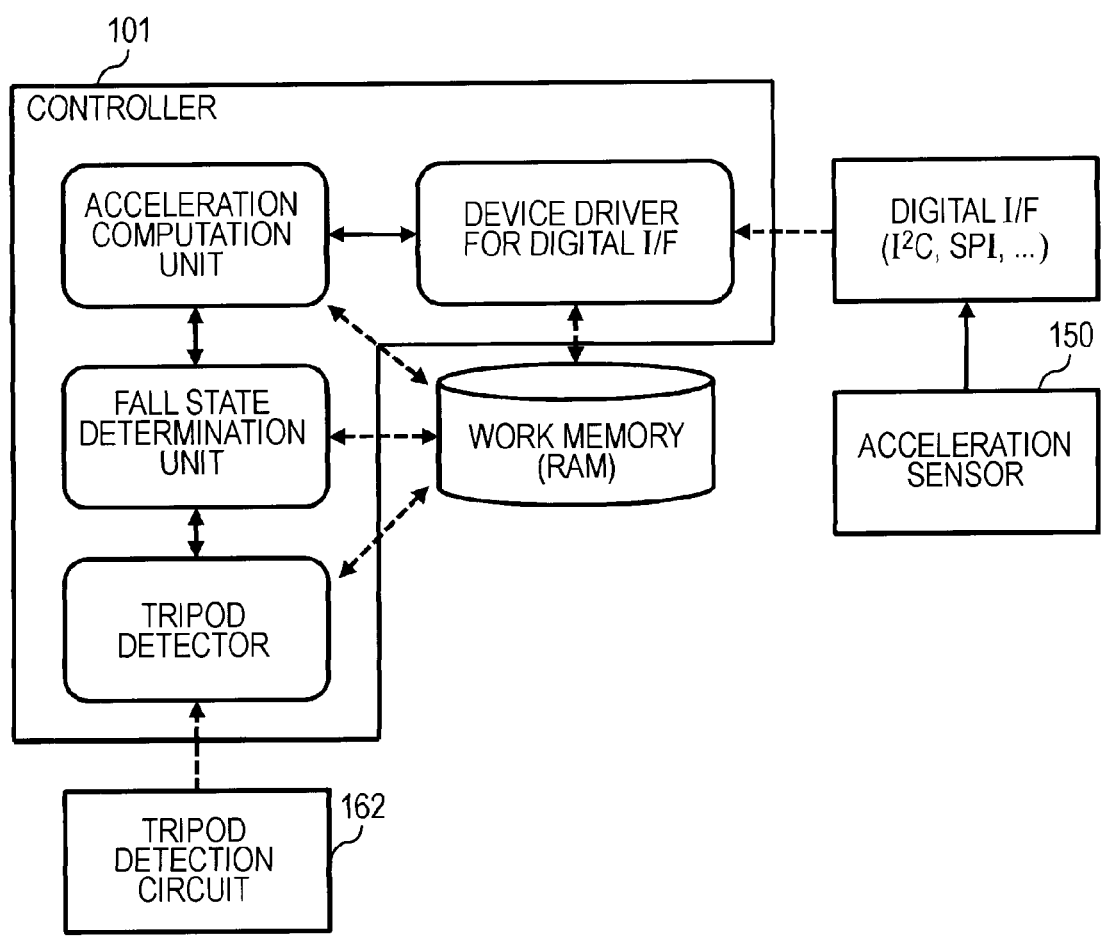
FIG. 12 schematically shows a functional configuration for implementing fall detection control when a detection signal of the acceleration sensor 150 is input in a digital manner.

The detection signal of the acceleration sensor 150 can be input in an analog manner and can also be input in a digital manner. FIG. 11 schematically shows a functional configuration for implementing fall detection control in a case in which the detection signal of the acceleration sensor 150 is input in an analog manner. FIG. 12 schematically shows a functional configuration for implementing fall detection control in a case in which a detection signal of the acceleration sensor 150 is input in a digital manner. In the former case, when an analog detection signal of the acceleration sensor 150 is converted from analog into digital form by an AD converter and the acceleration computation unit obtains a digital signal via a device driver for an AD converter, the acceleration computation unit computes the acceleration Gavg on the basis of equation (1) above. In the latter case, a digital detection signal of the acceleration sensor 150 can be received via a digital interface circuit such as an inter-integrated circuit ($I^2C$). When the acceleration computation unit obtains the digital signal via a device driver for a digital interface, the acceleration computation unit computes the acceleration Gavg on the basis of equation (1) above.

In FIGS. 11 and 12, the acceleration computation unit, the fall state determination unit, and the tripod detector can be installed as program code executed by the controller 101. Similarly to the foregoing, the tripod detector receives, in an analog or digital manner, the detection signal indicating whether or not the digital video camera 100 has been mounted on the tripod 20 from the tripod detection circuit 162 shown in FIG. 5 or 7. Then, the fall state determination unit performs a process for determining the fall state of the digital video camera 100 in accordance with the processing procedure shown in FIG. 4.

The present invention has been described above in detail while referring to the specific embodiments. However, it is obvious to a person skilled in the art to be able to make modifications and substitutions without departing from the spirit and scope of the present invention.

In this specification, a description has been given of the embodiments in which the invention is applied to a digital camera as a data recording apparatus having use modes for when the digital camera is fixed to a tripod and for when the digital camera is not fixed thereto. However, the spirit and scope of the present invention is not limited to these embodiments. The present invention can be applied to various portable devices having a plurality of use modes.

Furthermore, in this specification, a description has been given by mainly using a hard disk drive as a recording medium. However, the spirit and scope of the present invention is not limited to this, and the present invention can be applied to information apparatuses in which various types of recording media for which it is necessary to be prevented from being damaged when it is dropped are installed. It does not matter whether the recording medium is incorporated in a device or is detachably connectable to a device.

In summary, the present invention has been described in terms of exemplary embodiments, and the described content of this specification should not be construed as being limited. In order to determine the spirit and scope of the present invention, claims should be taken into consideration.

What is claimed is:

1. A data recording apparatus for recording data on a recording medium, the data recording apparatus comprising:
   acceleration detection means for detecting an acceleration which the apparatus is undergoing;
   use mode detection means for detecting which one of fixed and non-fixed modes the apparatus is used in;
   fall state determination means for determining a fall state of the apparatus by switching fall detection algorithms for detecting a fall of the apparatus on the basis of an acceleration detected by the acceleration detection means and a history of acceleration changes in accordance with a detection result by the use mode detection means; and
   preventive operation control means for causing an operation for preventing damage to the recording medium to be performed in accordance with a determination result of the fall state of the apparatus by the fall state determination means.

2. The data recording apparatus according to claim 1, wherein the recording medium is of a type in which a read/write head seeks a predetermined recording position on a recording surface of the recording medium and performs data recording, and
   when fall prediction means predicts that the apparatus may fall, the preventive operation control means prevents damage to the recording medium by retracting a read/write head away from the recording surface.

3. The data recording apparatus according to claim 1, wherein the acceleration detection means includes a three-axis acceleration sensor corresponding to three orthogonal axes of an X axis, a Y axis, and a Z axis, the three-axis acceleration sensor being disposed in the apparatus, and
   the fall state determination means periodically receives acceleration information detected by the three-axis acceleration sensor in the X, Y, and Z axes, records the acceleration information in a built-in memory, computes a combined value of the acceleration information computed as the sum of squares of acceleration values corresponding to the three orthogonal axes of the X axis, the Y axis, and the Z axis, records the combined value in the built-in memory, and determines whether or not the apparatus is falling on the basis of an input value from the three-axis acceleration sensor and acceleration history information recorded in the built-in memory.

4. The data recording apparatus according to claim 1, wherein the data recording apparatus is a digital camera for recording image-captured data, and
   the use mode detection means is a tripod detector configured to detect which one of use modes of fixed image capturing, in which the digital camera is mounted in a tripod and image capturing is performed, and non-fixed image capturing, in which the digital camera is not mounted in a tripod and image capturing is performed, the digital camera is in.

5. A method for controlling a data recording apparatus for recording data on a recording medium, the method comprising the steps of:
- detecting an acceleration which the apparatus is undergoing and a history of acceleration changes on the basis of an output of the acceleration sensor disposed in the data recording apparatus;
- detecting which one of fixed and non-fixed modes the apparatus is used in;
- determining a fall state of the apparatus by switching fall detection algorithms for detecting a fall of the apparatus on the basis of the detected acceleration and the history of acceleration in accordance with the detected mode; and
- causing an operation for preventing damage to the recording medium to be performed in accordance with the fact that the fall state of the apparatus is predicted.

6. A non-transitory computer readable storage medium storing computer program written in a computer-readable format so as to perform a process for controlling a data recording apparatus for recording data on a recording medium in a computer, the computer program causing the computer to function as:
- acceleration detection means for detecting an acceleration which the apparatus is undergoing and a history of acceleration changes on the basis of an output of the acceleration sensor disposed in the data recording apparatus;
- use mode detection means for detecting which one of fixed and non-fixed modes the apparatus is used in;
- fall state determination means for determining a fall state of the apparatus by switching fall detection algorithms for detecting a fall of the apparatus on the basis of the acceleration detected by the acceleration detection means and the history of the acceleration changes in accordance with the detection result by the use mode detection means; and
- preventive operation control means for causing an operation for preventing damage to the recording medium to be performed in accordance with the determination result of the fall state of the apparatus by the fall state determination means.

7. A data recording apparatus for recording data on a recording medium, the data recording apparatus comprising:
- an acceleration detector configured to detect an acceleration which the apparatus is undergoing;
- a use mode detector configured to detect which one of fixed and non-fixed modes the apparatus is used in;
- a fall state determination unit configured to determine a fall state of the apparatus by switching fall detection algorithms for detecting a fall of the apparatus on the basis of an acceleration detected by the acceleration detector and the history of acceleration changes in accordance with the detection result by the use mode detector; and
- a preventive operation controller configured to cause an operation for preventing damage to the recording medium to be performed in accordance with the determination result of the fall state of the apparatus by the fall state determination unit.

8. The data recording apparatus according to claim 1, wherein the use mode detection means is a tripod detector configured to detect that the data recording apparatus is connected to a tripod by sensing the presence of a tripod screw.

* * * * *